Sept. 18, 1962
J. W. BLANTON
3,054,388
SERVO VALVE WITH FLOW RATE FEEDBACK
Filed July 3, 1961
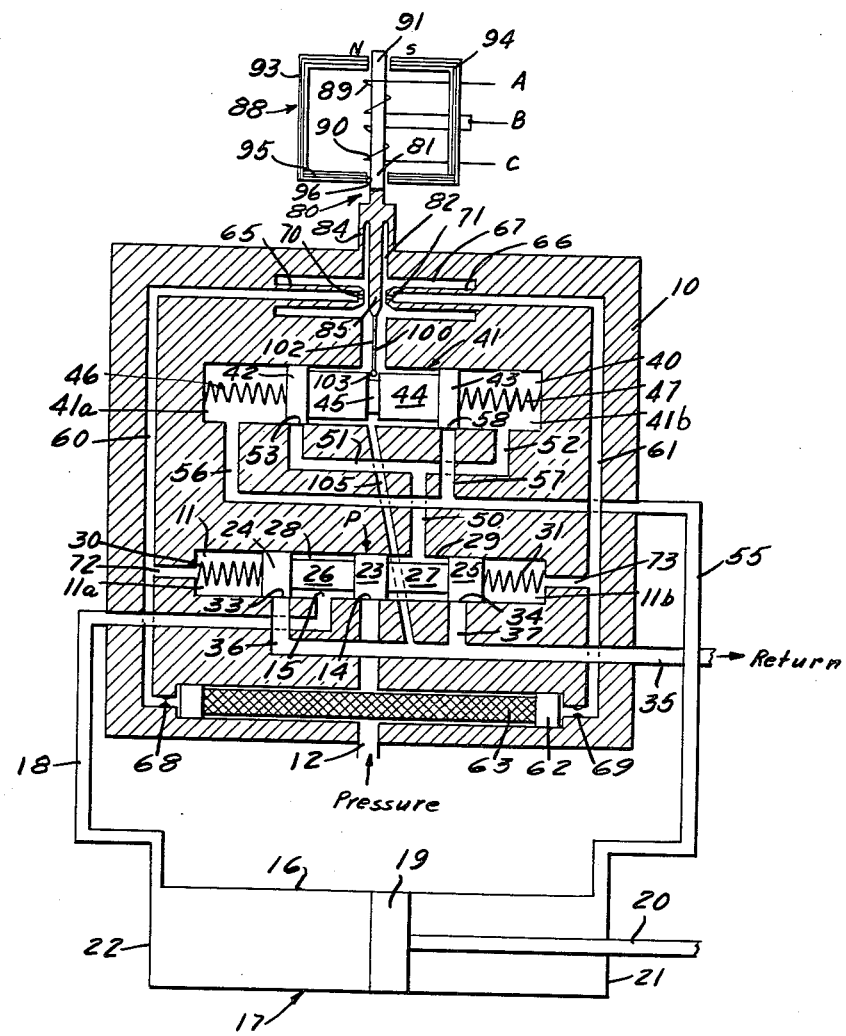
John W. Blanton,
INVENTOR.
WHANN & McMANIGAL
Attorneys for Applicant

United States Patent Office 3,054,388
Patented Sept. 18, 1962

3,054,388
SERVO VALVE WITH FLOW RATE FEEDBACK
John W. Blanton, Sunland, Calif., assignor to Bell Aerospace Corporation, Buffalo, N.Y., a corporation of Delaware
Filed July 3, 1961, Ser. No. 121,631
2 Claims. (Cl. 121—41)

This invention relates generally to servo mechanisms, and relates more particularly to servo mechanisms for hydraulic control systems.

While the invention has particular utility in connection with the control of hydraulic actuators and the like and is shown and described in such connection, it is to be understood, of course, that its utility is not confined thereto.

The control of hydraulic actuators by servo valve mechanisms involves certain problems, one of which is the measuring of the hydraulic flow rate, and it is, therefore, an object of the present invention to provide a servo valve control which will overcome such problems.

It is another object of the invention to provide an electro hydraulic flow control valve, the output flow of which is essentially independent of the hydraulic pressure drop across the valve.

It is still another object of the invention to provide a valve of this character within which is generated and fed back a term proportional to the valve output flow rate.

It is a further object of the invention to provide an electro-hydraulic servo valve which controls the hydraulic flow rate out of the valve proportional to the input current to the valve.

It is a still further object of the invention to provide a mechanism of this character wherein the output hydraulic flow rate is essentially independent of the hydraulic pressure across the valve.

It is another object of the invention to provide mechanism of this character having a movable wall, or piston, and wherein the hydraulic flow generates a pressure drop across a variable orifice causing motion of the movable wall against a reference force.

It is still another object of the invention to provide mechanism of this character wherein the motion of the movable wall or piston is proportional to the flow rate and this motion is measured and fed back to the flapper of the servo valve.

It is a further object of the invention to provide mechanism of this character wherein the deflection of the movable wall or piston is directly proportional to hydraulic flow rate out of the valve.

It is a still further object of the invention to provide mechanism of this character wherein the variable orifice is varied by the piston to provide the desired calibration of the feedback circuit.

It is still another object of the invention to provide mechanism of this character having symmetrical construction and mass balance.

It is still another object of the invention to provide mechanism of this character having maximum null stability for extreme environments.

It is a further object of the invention to provide mechanism of this character that is relatively simple in construction and relatively inexpensive to manufacture.

It is a still further object of the invention to provide mechanism of this character that is reliable and accurate in operation.

The characteristics and advantages of the invention are further sufficiently referred to in connection with the following detailed description of the accompanying drawing, which represents one embodiment. After considering this example, skilled persons will understand that variations may be made without departing from the principles disclosed, and I contemplate the employment of any structures, arrangements, or modes of operation that are properly within the scope of the appended claims.

Referring to the drawing, there is diagrammatically shown a servo valve mechanism embodying the present invention, said drawing being for purposes of illustration.

Referring more particularly to the drawing, there is shown a housing 10 having a bore 11 therein for a power valve, indicated generally at P.

There is a fluid pressure supply passage 12 extending into the body, said passage 12 being connected to any suitable source of pressure fluid, not shown. Passage 12 has a connection with the bore 11 through a pressure fluid port 14 intermediate the ends of the bore 11 and substantially at the longitudinal center thereof. At one side of the port 14 and spaced longitudinally therefrom is an actuator port 15 which is connected to one end of a cylinder 16 of an actuator, indicated generally at 17, the port 15 being connected to one end of the cylinder 16 by means of a conduit 18. Within the cylinder 16 is operably disposed a piston 19 having one end of a piston rod 20 connected thereto. Piston rod 20 extends through a wall 21 at one end of the cylinder 16 in the usual well known manner and may be provided with any suitable packing element, not shown, the opposite end of said cylinder being closed by a wall 22.

Valve P comprises a central spool 23 which, when the valve P is in its normal, centered position, as shown in the drawing, closes the port 14. There are end spools 24 and 25 in axial alignment with the spool 23, and said end spools are connected to the central spool by oppositely extending axially arranged reduced diameter parts 26 and 27 which define with adjacent portions of the wall of the bore 11, fluid chambers 28 and 29. Normal centering of the valve P is effected by springs 30 and 31 in the end portions of the bore 11 which is substantially longer than the valve P so as to provide outer end portions or spaces 11a and 11b which permit operative movement of the valve longitudinally in the bore 11, provide room for the springs 30 and 31 and also serve as pressure chambers at the opposite ends of the power valve P.

The fluid pressure system for the actuator has a fluid return arrangement which includes return ports 33 and 34, respectively, of the bore 11, said ports 33 and 34 being connected to a return line 35 by respective passages 36 and 37. Ports 33 and 34 are spaced longitudinally outwardly of the port 14 and when the valve P is in its normal centered or neutral position, the ports 33 and 34 are covered or closed by respective spools 24 and 25. Ports 33 and 34 are so related to the spools 24 and 25 that movement of the valve P in the bore 11 in either direction will immediately uncover one or the other of the ports 33 or 34, depending on the direction of movement of the valve. It is to be noted that the port 15 is disposed intermediate the ports 14 and 33 of the bore 11 and is in open communication with the chamber 28 at all times.

The mechanism also includes a hydraulic feedback arrangement which includes a hydraulic feedback cylinder or bore 40 in the body 10, in which is slidably disposed a feedback piston, indicated generally at 41, having spools 42 and 43 at opposite ends and joined together by a reduced diameter intermediate portion 44 which has an external annular groove 45 therein intermediate the ends of the piston. The cylinder 40 is substantially longer than the piston 41 and there are end portions 41a and 41b which comprise chambers for pressure fluid and also for accommodating feedback springs 46 and 47 which normally center the piston 41 in a neutral position in the cylinder 40.

There is a conduit 50 which is connected to that portion of the bore 11 comprising the chamber 29 and which is in open communication therewith at all times. The conduit 50 has branch conduits 51 and 52, the conduit 51 being connected to the cylinder 40 by means of a port 53 at a location whereat said port 53 is covered by the spool 42 when valve 41 is in its normal neutral position. Branch passage 52 is connected with the chamber 41b and is in free communication therewith at all times.

There is a conduit 55 having one end connected to the cylinder 16 of the actuator at the end opposite the connection of conduits 18 therewith. Conduit 55 has branches or branch passages 56 and 57, respectively, branch passage 56 being connected to the end portion 41a of the cylinder 40, while branch passage 57 is connected with the cylinder 40 by means of a port 58 located so as to normally be covered or closed by the spool 43 of the valve or piston 41 when said piston is in its normal neutral position.

The hydraulic control system includes a pair of passages which may be termed branch passages 60 and 61, said branch passages being operably connected to the supply passage 12. At the point of connection of said branch passages with the passage 12, there is an enlarged passage portion 62 in which a filter 63 is disposed. Branch passages 60 and 61 are connected to the respective chambers 11a and 11b and are also connected with the respective, oppositely arranged nozzles 65 and 66 which extend into a chamber 67. Upstream of the chambers 11a and 11b, the conduits 60 and 61 are each provided with a calibrated restricted orifice, said orifices being indicated at 68 and 69, respectively.

Nozzles 65 and 66 are axially arranged relative to each other and the open discharge ends thereof are spaced apart and have calibrated discharge orifices 70 and 71 therein. It is to be noted that the branch passages 60 and 61 are connected to the respective chamber portions 11a and 11b of the bore 11 by means of passages 72 and 73 respectively.

There is means for controlling the discharge of fluid from the nozzles 65 and 66 and said means comprises a flapper valve, indicated generally at 80. Valve 80 includes a stem 81 which has its lower or inner end extending into the chamber 67 through an opening 82 in the body 10. Opening 82 is of a substantially greater diameter than that of the stem portion therein to permit operative movement of said stem. The lower end portion of stem 81 is sealed to prevent leakage therepast by means of a tubular, isolation diaphragm 84 which provides a flexible pivotal support for the stem as well as a seal therefor. An example of such a diaphragm is disclosed in the Baltus et al. application, Serial No. 647,255, filed March 25, 1957, now U.S. Patent No. 2,947,285. The inner or lower stem 81 has a portion 85 disposed between the spaced ends of the nozzles 65 and 66 which is adapted to move toward and away from the adjacent ends of said nozzles to thereby vary the openings in said ends.

Various means may be used to actuate the valve 80 by actuation of the upper or outer portion of the stem 61 which pivots at the isolation diaphragm. As viewed in the drawing, the outer end portion of the stem 81 is adapted to swing clockwise and counterclockwise to thereby swing the end portion 85 toward and away from the open ends of the nozzles 65 and 66.

One means for actuating the valve 60 comprises a torque motor, indicated generally at 88, and includes coils 89 and 90. Coil 89 is connected to suitable electrical equipment, not shown, by wires A and B, while coil 90 is likewise connected to such electrical equipment by wires B and C. The upper portion 91 of the stem 81, exterior of the diaphragm 84, comprises an armature of suitable material to be magnetically actuated, such material being soft steel, or the like, for example. Armature 91 is operably disposed relative to the coils 89 and 90 so that energization of either of said coils will effect operative movements of the armature 91 of stem 81 clockwise or counterclockwise according to which of the coils is energized. The torque motor 88 also includes a pair of oppositely arranged frames 93 and 94 which are in the general shape of inverted L's. The lower ends of the frames 93 and 94 are operably attached in the well known manner to a magnet 95 having an opening 96 therein through which the stem operably extends. The adjacent free ends of the horizontal portions of the frames 93 and 94 are spaced apart with the upper end of the armature 91 operably disposed therebetween. The space between the free ends of the frames 93 and 94 is sufficiently great to permit proper operative movements of said armature and said adjacent ends of the frames are of opposite polarity, one being a south pole and the other being a north pole.

The flapper valve includes a feedback spring 100 which extends from the lower end of the part 85 of the stem 81 through an opening 102 between the chamber 67 and the cylinder 40. The lower free end of the spring 100 is enlarged and rounded, as at 103, and the part 103 is operably disposed in the annular groove 45 of the piston 41.

Fluid discharged into the chamber 67 by the nozzles 65 and 66 flows to the return conduit 35 through the opening 102, the space between the reduced diameter portion 45 of piston 44 and the adjacent wall of the cylinders 40 and conduit 105. It is to be noted that conduit 105 connects with the branch passage or conduit 36 which in turn is connected to the return conduit 35.

Operation

The mechanism above described is an electro-hydraulic servo valve with the hydraulic flow rate feedback which provides an output hydraulic flow rate proportional to the input current and is essentially independent of the hydraulic pressure across the valve.

In response to electrical signals, the torque motor generates a torque on the flapper valve which causes a displacement thereof toward one or the other of the nozzles 65 and 66, thereby unbalancing the hydraulic pressures in the branch passages 60, 61, and hence on the opposite ends of the power stage spool or valve P, causing displacement of said valve P.

The resulting displacement of the power stage spool or valve P allows hydraulic fluid to flow out of one of the cylinder or actuator ports and into the other cylinder or actuator port. This flow causes a proportional displacement of the feedback piston 41, which measures the flow from said power stage spool. The flow metering feedback element or piston is coupled by the cantilever feedback spring 100 to the member 85 of the flapper valve and movement of said piston operates through the feedback spring 85 to create a torque on the flapper valve suspension spring equal to and in phase opposition to the initiating induced torque of the torque motor, thus balancing the force across the power stage spool or valve P and maintaining a stable flow rate through the actuator or cylinder ports.

Operation of the flow feedback measuring element is as follows:

Flow from the power stage spool or valve P is diverted to a square root shaped orifice, 53 or 58, depending on the direction of movement of the power valve P, and the pressure drop across this square root area orifice is impressed across the spring centered flow feedback piston 41 in such a manner that the position of the piston 41 is directly proportional to the square root of the pressure drop across the piston and, thusly, directly proportional to the flow through the orifice.

Since the basic operation of the servo valve is based on four-way flow control, such that flow reversal occurs through the cylinder or actuator ports, the flow feedback circuit is provided in series with only one of the two cylinder or actuator port circuits.

The invention and many of its attendant advantages will be understood from the foregoing description, and it will be apparent that various changes may be made in the form, construction and arrangement of the parts of the invention without departing from the spirit and scope thereof or sacrificing its material advantages, the embodiment hereinbefore described being merely for purposes of illustration.

I claim:

1. A control mechanism, comprising: a fluid pressure actuator operable in opposite directions; a hydraulically actuated power valve mechanism, including a power valve cylinder having a pressure fluid supply port, a fluid return port at each side of the pressure fluid supply port, and a fluid actuator port having a fluid connection with the actuator; a movable power valve member operably disposed in said cylinder and normally closing the supply port and the return ports when said valve is centered; yielding centering means for said power valve member, said power valve member having oppositely arranged pressure areas of equal size and normally subjected to fluid pressures of equal value; pilot valve means having a neutral position and selectively responsive to control signals to vary one of the equal pressures on said valve member and thus effect operative movement thereof; flow feedback measuring means comprising a feedback cylinder having a pair of longitudinally spaced ports therein connected to the power valve mechanism and supplied with pressure fluid when the power valve is actuated to effect actuation of said actuator, said feedback cylinder having a second pair of ports connected with said actuator; a feedback piston operably mounted in said cylinder; yielding means normally positioning said feedback piston in a position whereat one of each of the pairs of ports is closed, one of the first mentioned pair of ports being located outwardly of the adjacent end of the piston and the other of the second set of ports being located outwardly of the other end of said piston and being connected to the actuator; and resilient means connecting the feedback piston with said pilot valve means to create a torque on said pilot valve means equal to and in phase opposition to the initiating induced torque of the torque motor.

2. In a control mechanism: a fluid pressure actuator mechanism operable in opposite directions; a hydraulically actuated power valve mechanicm including a pressure fluid supply port, a pair of return ports and a pair of actuator ports having fluid actuator circuits connecting said actuator ports with said actuator for operating same in respective directions; a power valve mechanism including a movable power valve member; yielding means normally centering said power valve member, said power valve member, when centered, closing said pressure fluid supply port and the return ports; pilot valve means having a neutral position and selectively responsive to control signals to variably control the position of said power valve member; flow feedback measuring means interposed in series in one of the actuator circuits, said flow feedback means including variable square root orifices and a feedback piston controlling said variable orifices and subjected to pressure in said actuator circuit; and a mechanical connection between said feedback piston and said pilot valve means.

References Cited in the file of this patent

UNITED STATES PATENTS

| 2,654,348 | Beck | Oct. 6, 1953 |
| 2,909,195 | Keyt | Oct. 20, 1959 |
| 2,939,430 | Westbury | June 7, 1960 |
| 2,953,149 | Lynn | Sept. 20, 1960 |

OTHER REFERENCES

Applied Hydraulics and Pneumatics Magazine, Industrial Publishing Corp., February 1959, page 74.